Jan. 15, 1929.
W. C. SLEEMAN
BRAKE HANGER BRACKET
Filed Nov. 8, 1926
1,698,740
2 Sheets-Sheet 2
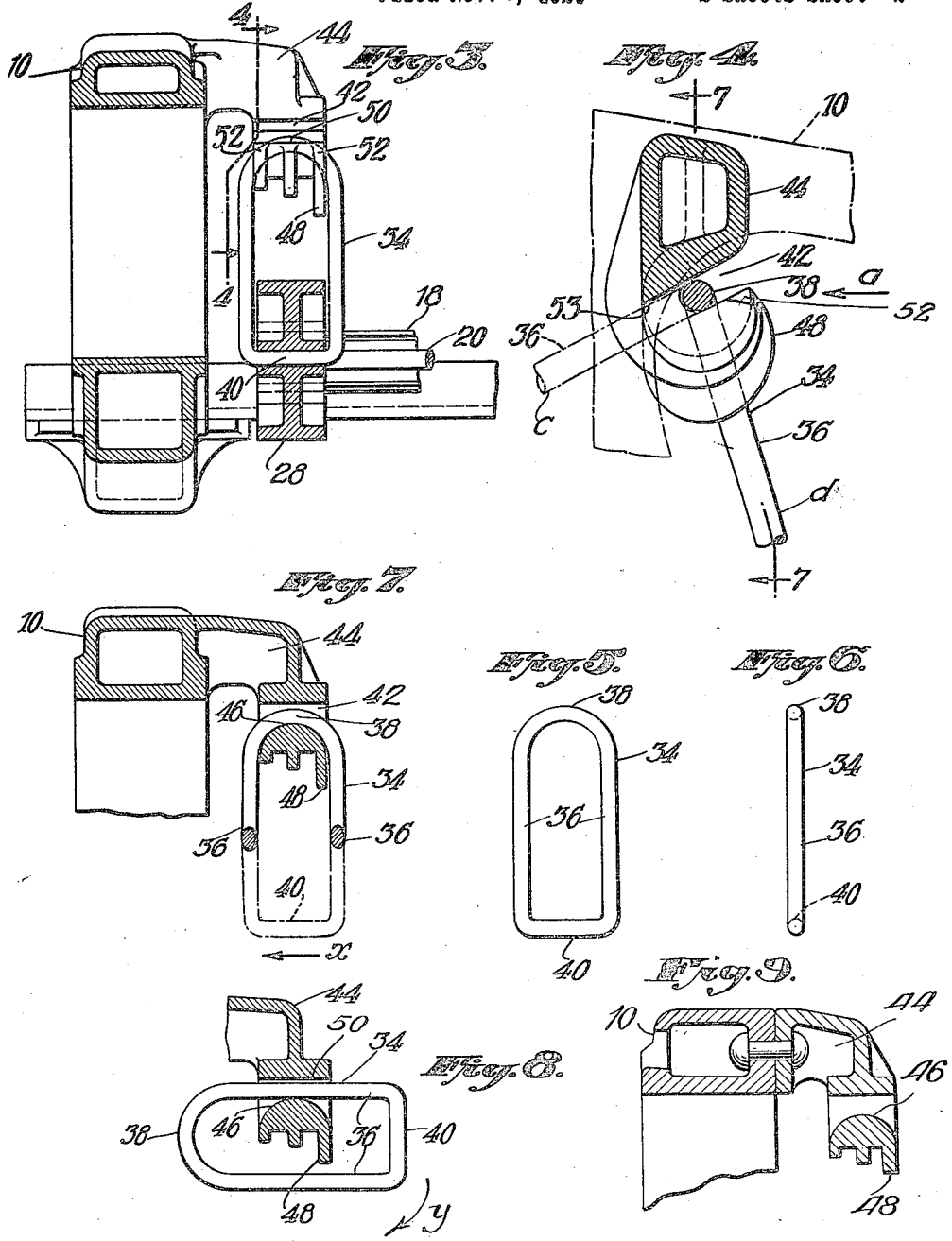

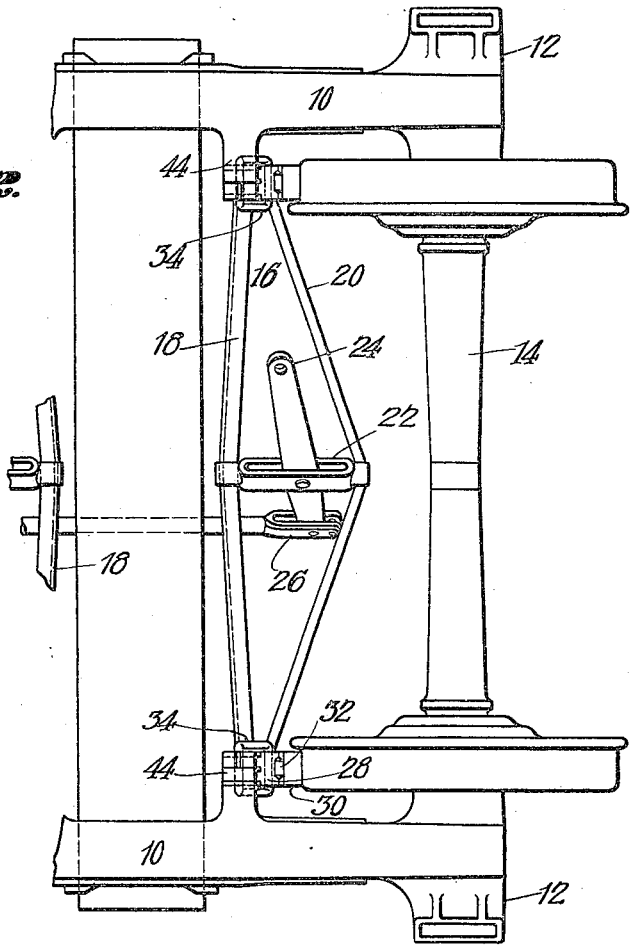
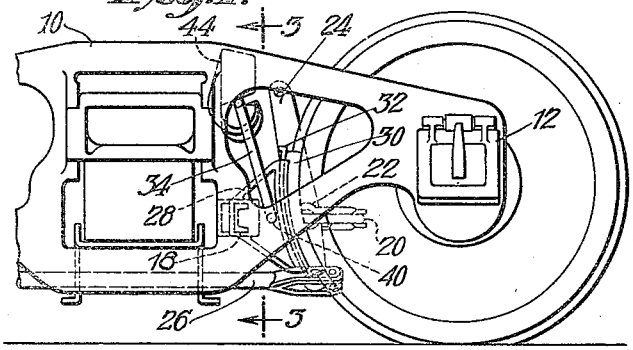

Patented Jan. 15, 1929.

1,698,740

UNITED STATES PATENT OFFICE.

WILLIAM C. SLEEMAN, OF BIRMINGHAM, ALABAMA.

BRAKE-HANGER BRACKET.

Application filed November 8, 1926. Serial No. 146,982.

This invention relates broadly to car truck construction and has particular reference to means for supporting the brake beams thereof. The invention will be apparent from the following specification when read in connection with the accompanying drawings and the features of novelty will be pointed out with particularity in the appended claims.

In the drawings—

Fig. 1 is a side elevation of one end of the car truck having brake hanger supporting means embodying my invention;

Fig. 2 is a plan of part of the car truck shown in Fig. 1;

Fig. 3 is a transverse section on line 3—3 of Fig. 1 with parts omitted in the interest of clearness;

Fig. 4 is a section on line 4—4 of Fig. 3 showing in detail the construction of brake hanger supporting bracket;

Figs. 5 and 6 are, respectively, face and side views of the brake hanger;

Fig. 7 is a detail section on line 7—7 of Fig. 4 showing the brake hanger in place;

Fig. 8 is a face view of part of the brake hanger bracket viewed in the direction of the arrow $a$ in Fig. 4 showing the manner in which the brake hanger is engaged with the brake hanger bracket.

Fig. 9 is a view showing a modification.

Referring in detail to the drawings, 10 represents the side frame of a car truck having a suitable journal box 12 for supporting the wheel axle 14. The car truck as shown is equipped with a suitable brake beam 16 consisting of a compression member 18, tension member 20, the usual center strut 22 and brake operating lever 24 which at its lower end is connected with the usual bottom operating rod 26. The brake beam carries a suitable brake head 28 to which a brake shoe 30 is secured by means of a suitable key 32.

The brake head and associated brake beam is suspended from the body of the car truck by means of a plurality of brake hanger 34 of the design shown in Figs. 1, 5 and 6. The hanger, it will be observed, is in the form of a link consisting of side legs 36—36 which are substantially parallel to one another, a substantially semi-circular arch portion 38, the ends of which merge substantially tangentially from the side legs. At their lower ends the legs 36—36 are connected by a straight bridge portion 40. The bridge portion 40 forms the pintle or journal connection with the brake head. The upper circular arch portion of the brake hanger is seated in the slot 42 formed in the brake hanger bracket 44 which in the case illustrated is cast integrally with the truck side frame 10. It is, of course, to be understood that the brake hanger bracket if desired may be either riveted, welded or otherwise made fast to the side frame as shown in Fig. 9.

Under normal operating conditions, the brake hanger is positioned as shown in Figs. 3 and 7. In this position it will be noted that the curved or arched portion 38 is seated on a similarly curved bearing portion 46. This curved seat is so formed that the brake hanger can partake of an appreciable swinging movement as indicated by the different positions thereof shown in dotted and full lines at $c$ and $d$ in Fig 4. Swinging movement of the brake hanger in the direction of the arrow $x$ in Fig. 7 is prevented by means of a depending flange 48 formed integrally on the brake hanger bracket.

The formation of the slot or seat for the brake hanger is such that it is prevented from jumping out through the open mouth of the slot. Reference to Fig. 3 will show that the throat 50 of the slot 42 extends straight across the face of the brake hanger bracket. As thus arranged it is clear that there is a body of metal 52—52 which lies in front of the curved arch portion of the brake hanger which body of metal serves as an obstruction to prevent the hanger from jumping out while in service. The portions 52 also serve to limit the swinging movement of the hanger in one direction. The swinging movement of the hanger in the opposite direction is limited by a shoulder 53 located at the line where the curved seat of the hanger bracket meets the overhanging part of the slot 42.

To assemble the brake hanger on its supporting bracket, the hanger is turned to a position 90° from its normal operating position as illustrated in Fig. 8 so that one of the straight leg portions 36 can be passed through the straight throat 50 of the slot 42. The hanger is then swung downward in the direction of the arrow $y$ so as to bring the curved arch portion 38 into the position shown in Fig. 7. From the foregoing it is noted that the brake beam is operatively supported by the hanger without the use of keys, pins, bolts, cotter pins, nuts or the like which are apt to be dislodged or lost in operation. The importance of this will be recognized by those skilled in the art. Also it will be appreciated that the interlocking connection between the brake hanger and its supporting bracket possesses advantageous characteristics of great utility.

Though I have described quite specifically the details of construction or embodiment of the invention illustrated, it is not be construed that I am limited thereto since various modifications and substitution of equivalents may be made by those skilled in the art without departing from the invention as defined in the appended claims.

What I claim is:

1. In a car truck, the combination with a side frame and brake beam thereof, of a hanger comprising substantially straight side legs joined at their upper ends by a curved arch portion, the lower ends of said legs being operatively connected with the brake beam, a brake hanger bracket carried by said side frame, said bracket having a slot therein the mouth of which extends in substantially parallel lines across one face of the bracket, said bracket having a bearing surface adjacent said slot forming a curved seat shaped to correspond to the curvature of said arch portion, a lug extending laterally from said curved seat for limiting swinging movement of the hanger about said curved bearing portion as a fulcrum.

2. In a brake mechanism including a side frame, a brake beam, a brake hanger operatively connected with the latter, a hanger bracket secured to said side frame, said hanger having substantially parallel legs united at the top by a curved bridge, said hanger bracket having a bearing surface whose cross-sectional shape corresponds substantially with the curvature of said bridge and abutments extending substantially perpendicular to said curved bearing surface for limiting the swinging movement of said hanger.

In witness wherof, I have hereunto signed my name.

WILLIAM C. SLEEMAN.